US012728770B2

(12) United States Patent
Jonsson et al.

(10) Patent No.: US 12,728,770 B2
(45) Date of Patent: Sep. 8, 2026

(54) VEHICLE SEAT AND A METHOD FOR OPERATING A VEHICLE SEAT

(71) Applicants: Ningbo Geely Automobile Research & Development Co., Ltd., Ningbo (CN); Zhejiang Geely Holding Group Co., Ltd., Zhejiang (CN)

(72) Inventors: Tony Jonsson, Alingsås (SE); Svante Almhage, Vänersborg (SE); Christer Gewert, Lindome (SE); Henrik Hellekant, Gothenburg (SE); Ricardo Quincoses, Trollhättan (SE); Johan Höcks, Varberg (SE)

(73) Assignees: Ningbo Geely Automobile Research & Dev. Co., Ltd., Ningbo (CN); Zhejiang Geely Holding Group Co., Ltd., Zhejiang (CN)

( * ) Notice: Subject to any disclaimer, the term of this patent is extended or adjusted under 35 U.S.C. 154(b) by 248 days.

(21) Appl. No.: 18/615,975

(22) Filed: Mar. 25, 2024

(65) Prior Publication Data

US 2024/0227629 A1 Jul. 11, 2024

Related U.S. Application Data

(63) Continuation of application No. PCT/CN2022/124388, filed on Oct. 10, 2022.

(30) Foreign Application Priority Data

Oct. 14, 2021 (EP) .................................... 21202776

(51) Int. Cl.
*B60N 2/02* (2006.01)
*B60N 2/20* (2006.01)
*B60N 2/68* (2006.01)

(52) U.S. Cl.
CPC ........... *B60N 2/02253* (2023.08); *B60N 2/20* (2013.01); *B60N 2/68* (2013.01)

(58) Field of Classification Search
CPC .............. B60N 2/20; B60N 2002/2204; B60N 2/2209; B60N 2/2222; B60N 2/02253; B60N 2/02258; B60N 2/68; B60N 2/829
See application file for complete search history.

(56) References Cited

U.S. PATENT DOCUMENTS 5,306,073 A * 4/1994 Rees ...................... B60N 2/233 297/378.12
6,962,392 B2 * 11/2005 O'Connor .............. B60N 2/888 297/408

(Continued)

FOREIGN PATENT DOCUMENTS

DE 2212653 A1 5/1973
DE 3129101 A1 3/1983

(Continued)

OTHER PUBLICATIONS

International Search Report from corresponding Intenational Application No. PCT/SE2022/124388, Jan. 10, 2023, 2 pages.

*Primary Examiner* — Philip F Gabler
(74) *Attorney, Agent, or Firm* — Tucker Ellis LLP

(57) ABSTRACT

A vehicle seat includes a lower frame and an upper frame, where the upper frame is pivotably arranged in relation to the lower frame. The upper frame is movably connected to the lower frame via an actuating assembly, where the actuating assembly includes a first actuator and a second actuator configured to cooperate with each other for displacing the upper frame in relation to the lower frame. The actuating assembly further includes a beam structure connected to and extending between the first actuator and the (Continued)

second actuator, where the first actuator and the second actuator are floatingly connected to the lower frame via the beam structure.

16 Claims, 9 Drawing Sheets

(56) References Cited

U.S. PATENT DOCUMENTS

| | | | | |
|---|---|---|---|---|
| 7,543,888 | B2 * | 6/2009 | Kuno | B60N 2/02246 297/391 |
| 7,547,068 | B2 * | 6/2009 | Davis | B60N 2/809 297/284.3 |
| 8,348,339 | B2 * | 1/2013 | Onuma | B60N 2/02246 297/284.3 |
| 8,794,705 | B2 * | 8/2014 | Steinmetz | B60N 2/815 297/410 |
| 8,998,325 | B2 * | 4/2015 | Jonsson | B60N 2/42709 297/216.19 |
| 9,610,864 | B2 * | 4/2017 | Uebelacker | B60N 2/2222 |
| 9,937,835 | B1 * | 4/2018 | Khalid | B60N 2/643 |
| 9,975,454 | B2 * | 5/2018 | Cailleteau | B64D 11/06 |
| 10,035,442 | B2 * | 7/2018 | Kondrad | B60N 2/829 |
| 10,059,227 | B2 * | 8/2018 | Kostin | B60N 2/067 |
| 11,173,810 | B2 * | 11/2021 | Matsuzawa | B60N 2/58 |
| 11,305,676 | B2 * | 4/2022 | Eichhorn | B60N 2/6673 |
| 2002/0135214 | A1 | 9/2002 | Ursel et al. | |
| 2007/0205626 | A1 | 9/2007 | Ohtsubo et al. | |
| 2013/0169015 | A1 | 7/2013 | Perraut et al. | |
| 2018/0264976 | A1 * | 9/2018 | Novitsky | B60N 2/2231 |
| 2019/0061569 | A1 * | 2/2019 | Bowen | B60N 2/2252 |

FOREIGN PATENT DOCUMENTS

| | | | |
|---|---|---|---|
| EP | 1780071 | A2 | 2/2007 |
| WO | 2007053101 | A1 | 5/2007 |

* cited by examiner

VEHICLE SEAT AND A METHOD FOR OPERATING A VEHICLE SEAT

RELATED APPLICATION DATA

This application is a continuation of International Patent Application No. PCT/CN2022/124388, filed Oct. 10, 2022, which claims the benefit of European Patent Application No. 21202776.7, filed Oct. 14, 2021, the disclosures of which are incorporated herein by reference in their entireties.

TECHNICAL FIELD

The present disclosure relates to a vehicle seat comprising a lower frame and an upper frame, where the upper frame is pivotably arranged in relation to the lower frame. The upper frame is movably connected to the lower frame via an actuating assembly. The disclosure further relates to a method for operating a vehicle seat.

BACKGROUND

Vehicle seats are commonly adjustable for enabling comfortable and ergonomic seating positions for users of a vehicle. Traditional adjustable vehicle seats are arranged with an actuator for adjusting the seat structure of the vehicle seat. Often, the positioning of the actuator is offset in relation to the seat structure, which gives an unbalanced solution. Many times, the vehicle seats are therefore designed with a torsional stiff frame to handle the unbalance, which results in vehicle seat structures that are complex in design, costly, and heavy. Another problem is that the gearbox and motor assembly of the actuator normally is part of the load path, and the load path and actuator cannot be individually tuned. Normally, the motors are rigidly fixed, limiting the design freedom and load path optimizations. This may be of specific concern when designing vehicle seats with fully integrated seat belts, since the forces exerted on the seats are high in a vehicle impact event and the seat per se needs to absorb the forces.

There is thus a need for a vehicle seat that is strong in construction, simple, balanced, and lightweight, and further has optimized load paths through the vehicle seat structure. It is further desired that the vehicle seat is simple in construction and possible to manufacture at a low cost.

SUMMARY

An object of the present disclosure is to provide a vehicle seat and a method for operating a vehicle seat where the previously mentioned problems are avoided.

The disclosure concerns a vehicle seat comprising a lower frame and an upper frame, where the upper frame is pivotably arranged in relation to the lower frame. The upper frame is movably connected to the lower frame via an actuating assembly, where the actuating assembly comprises a first actuator and a second actuator configured to cooperate with each other for displacing the upper frame in relation to the lower frame. The actuating assembly further comprises a beam structure connected to and extending between the first actuator and the second actuator, where the first actuator and the second actuator are floatingly connected to the lower frame via the beam structure.

Advantages with these features are that with two actuators, the vehicle seat can be designed with a balanced construction, where the load paths are optimized. The two actuators can be used for avoiding an offset construction in order to optimize the load distribution in different parts of the vehicle seat, where the load paths and actuators can be individually tuned. Further, the vehicle seat can be made lightweight and simple in construction at a low cost, since the actuators can be used for making the construction rigid with increased torsional stiffness. The floating connection between the actuators and the lower frame is enabling design freedom and load path optimizations. This may be of specific importance when designing vehicle seats with fully integrated seat belts, since the forces exerted on the seats are high in a vehicle impact event and the seat per se needs to absorb the forces. With the two actuators, the vehicle seat can be optimized for increased stiffness.

In one embodiment, the first actuator comprises a first drive unit attached to the beam structure. The first drive unit is floatingly connected to the lower frame via the beam structure. The second actuator comprises a second drive unit attached to the beam structure. The second drive unit is floatingly connected to the lower frame via the beam structure. The floating connection of the respective drive units to the lower frame via the beam structure is providing a way to control and optimize the load paths. The floating arrangement is allowing the drive units to be isolated from the load paths of the seat construction, and the drive units are thus only used for driving the actuators. Through the floating construction, and the connection of the two actuators by the beam structure, the drive units are rigidly connected to each other to control the torque delivered from them.

According to an embodiment, the first actuator comprises a first displacement member rotatably connected to the beam structure. The first drive unit is connected to the first displacement member and configured for rotating the first displacement member when displacing the upper frame in relation to the lower frame. The second actuator comprises a second displacement member rotatably connected to the beam structure. The second drive unit is connected to the second displacement member and configured for rotating the second displacement member when displacing the upper frame in relation to the lower frame. The displacement members are efficiently displacing the upper frame in relation to the lower frame though rotational interaction from the drive units. The connection of the displacement members to the beam structure is allowing the drive units and the displacement members to move in relation to the lower frame upon displacement of the upper frame for an efficient and balanced actuation, where the load is distributed via the displacement members arranged between the lower frame and the upper frame.

According to an embodiment, the first drive unit and the second drive unit are synchronized electric motors. The synchronized operation of the drive units is used for a balanced adjustment of the upper frame relative to the lower frame. When there is a desire to raise or lower the upper frame relative to the lower frame, the first drive unit and the second drive unit are operated simultaneously through the synchronized configuration. The drive units or the displacement members are suitably connected to sensors for measuring the displacement of the upper frame or the rotational movement of the drive units in order to control that the operation is fully synchronized. By using an electronic synchronization of the electric motors, the seat is always levelled, and further advantages with electronic synchronization are packaging efficiency and greater design freedom. The adjustment of the vehicle seat could be initiated by a user of the vehicle or automated and controlled via a control unit. To control the load paths, the floating arrangement is allowing the electric motors to be isolated from the load paths of the seat construction, and the electric motors are thus only used for driving the displacement members. By the floating construction, and through the connection of the two actuators by the beam structure with good bending and torsional stiffness, the electric motors are rigidly connected to each other to control the torque delivered from them.

According to an embodiment, the first displacement member is connected to the upper frame via a first pivoting member and the second displacement member is connected to the upper frame via a second pivoting member. The first pivoting member and the second pivoting member are pivotably connected to the upper frame. The pivoting members are allowing pivotal movement of the displacement members relative to the upper frame for an efficient operation of the actuators.

According to an embodiment, the first displacement member is rotatably connected to the first pivoting member and the second displacement member is rotatably connected to the second pivoting member. The first displacement member is configured for displacing the upper frame in relation to the lower frame upon rotation of the first displacement member, and the second displacement member is configured for displacing the upper frame in relation to the lower frame upon rotation of the second displacement member. The rotational connection is allowing relative movements between the displacement members and the pivoting members, where the relative movements are used for displacing the upper frame relative to the lower frame.

According to an embodiment, the first displacement member is arranged as a threaded screw having an extension in a first axial direction and a first threaded section. The first pivoting member comprises a first threaded opening configured for engaging the first threaded section, where upon rotation of the first displacement member the first pivoting member is displaced along the first displacement member in the first axial direction. The second displacement member is arranged as a threaded screw having an extension in a second axial direction and a second threaded section. The second pivoting member comprises a second threaded opening configured for engaging the second threaded section, where upon rotation of the second displacement member the second pivoting member is displaced along the second displacement member in the second axial direction. The threaded construction is providing a simple, reliable, and efficient way of adjusting the upper frame relative to the lower frame, where the pivoting members are displaced axially in relation to the respective displacement members.

In a further embodiment, the first pivoting member and the second pivoting member are connected to a beam member of the upper frame. The beam member is extending in a lateral direction. The beam member is used for a stiff and secure construction of the upper frame, which efficiently is transferring loads from the displacement members upon actuation.

In a further embodiment, the beam structure is slidingly arranged relative to a cradle structure of the lower frame. Upon displacement of the upper frame in relation to the lower frame, the beam structure is sliding relative to the cradle structure. The sliding arrangement of the beam structure relative to the cradle is enabling controlled load paths, where the floating connection of the actuators to the lower frame is allowing the actuators to move in relation to the lower frame for an efficient load distribution through the displacement members.

According to an embodiment, the cradle structure is extending in a lateral direction. The extension in the lateral direction is allowing an efficient sliding arrangement between the beam structure and the cradle structure.

According to an embodiment, the first displacement member and the second displacement member are extending through the cradle structure. The extension of the displacement members through the cradle structure is enabling a compact and efficient construction of the vehicle seat. The displacement members can be displaced in relation to the vehicle seat through the connection to the beam structure and the electric motors can be positioned below the cradle structure in driving engagement with the displacement members for a compact design.

According to an embodiment, the beam structure comprises a first structural element arranged in connection to a lower end of the first displacement member and a second structural element arranged in connection to a lower end of the second displacement member. The first structural element and the second structural element are arranged below the cradle structure and configured for preventing upward movements of the first displacement member and the second displacement member in a vehicle impact event.

In a further embodiment, a front part of the upper frame is pivotably arranged in relation to a front part of the lower frame around a front pivot axis. The pivotal arrangement of the front part of the upper frame is establishing a simple movement of the seat structure, where a fixed pivot in the front part of the vehicle seat and the floating arrangement of the actuators together are used for displacing the upper frame.

In a further embodiment, a rear part of the upper frame is movably connected to a rear part of the lower frame via the actuating assembly. The displacement members are connecting the rear parts and the movable connection together with the pivotal arrangement of the front part of the upper frame is establishing a simple movement of the seat structure.

In a further embodiment, the first actuator is arranged in connection to a first rear lateral side of the lower frame, and the second actuator is arranged in connection to a second rear lateral side of the lower frame. With this arrangement, the seat can be fully balanced with optimized load paths, through the positioning of the first actuator in connection to the first rear lateral side of the lower frame and the second actuator to the second rear lateral side of the lower frame. The displacement members of the actuators can absorb forces in a vehicle impact event and efficiently distribute loads between the upper frame and the lower frame.

The disclosure further concerns a method for operating a vehicle seat, where the vehicle seat comprises a lower frame and an upper frame. The upper frame is pivotably arranged in relation to the lower frame, and the upper frame is movably connected to the lower frame via an actuating assembly. The actuating assembly comprises a first actuator, a second actuator, and a beam structure connected to and extending between the first actuator and the second actuator. The first actuator and the second actuator are floatingly connected to the lower frame via the beam structure. The method comprises the step: operating the first actuator and the second actuator, where the first actuator and the second actuator upon operation are cooperating for displacing the upper frame in relation to the lower frame. A simultaneous operation of the two actuators is efficiently displacing the upper frame relative to the lower frame for an efficient vehicle seat adjustment. With the two actuators, the vehicle seat can be designed with a balanced construction, where the load paths are optimized. The floating connection between the actuators and the lower frame is enabling design freedom and load path optimizations. This may be of specific importance when designing vehicle seats with fully integrated seat belts, since the forces exerted on the seats are high in a vehicle impact event and the seat per se needs to absorb the forces. With the two actuators, the vehicle seat can be optimized for increased stiffness.

BRIEF DESCRIPTION OF THE DRAWINGS

The disclosure will be described in detail in the following, with reference to the attached drawings, in which.

DETAILED DESCRIPTION OF EXAMPLE EMBODIMENTS

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Figure 1:
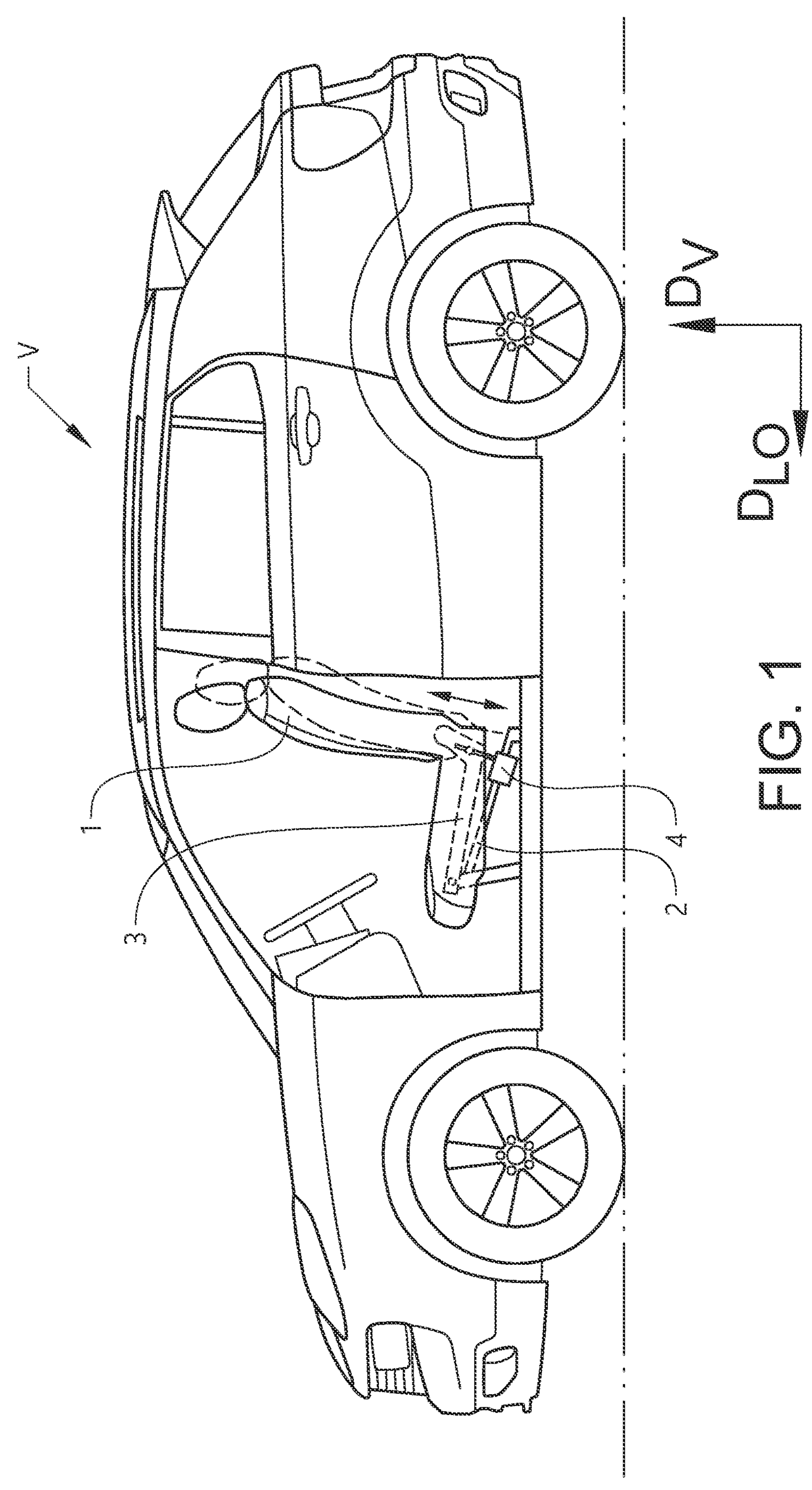
FIG. 1 shows schematically, in a side view, a vehicle with a vehicle seat comprising an actuating assembly according to the disclosure.

FIG. 1 schematically shows a vehicle V with an adjustable vehicle seat 1 equipped with an actuating assembly 4. The vehicle seat 1 may be suitable for use in any type of vehicle V, such as for example cars as illustrated in the figure. In the figures, the frame structure and the actuating assembly are illustrated. It should however be understood that the vehicle seat may involve other non-illustrated components or structural parts, such as for example padded or upholstered seat components and seat cover fabrics or other cover structures.

The vehicle seat 1 has an extension in a longitudinal direction $D_{LO}$ corresponding to a longitudinal direction of the vehicle V in which the vehicle seat 1 is arranged. A lateral direction $D_{LA}$ is defined as a direction perpendicular to the longitudinal direction $D_{LO}$ corresponding to a lateral direction of the vehicle V. A vertical direction $D_V$ is defined as a direction perpendicular to the longitudinal direction $D_{LO}$ and the lateral direction $D_{LA}$, corresponding to a vertical direction of the vehicle V. The expressions upper, lower, upwards, and downwards, used in this context are referring to directions in relation to the vehicle seat 1 in the vertical direction $D_V$. The expressions front, rear, forwards, and rearwards used in this context are referring to directions in relation to the vehicle seat 1 in the longitudinal direction $D_{LO}$. The directions are for example indicated in FIG. 2.

Figure 2:
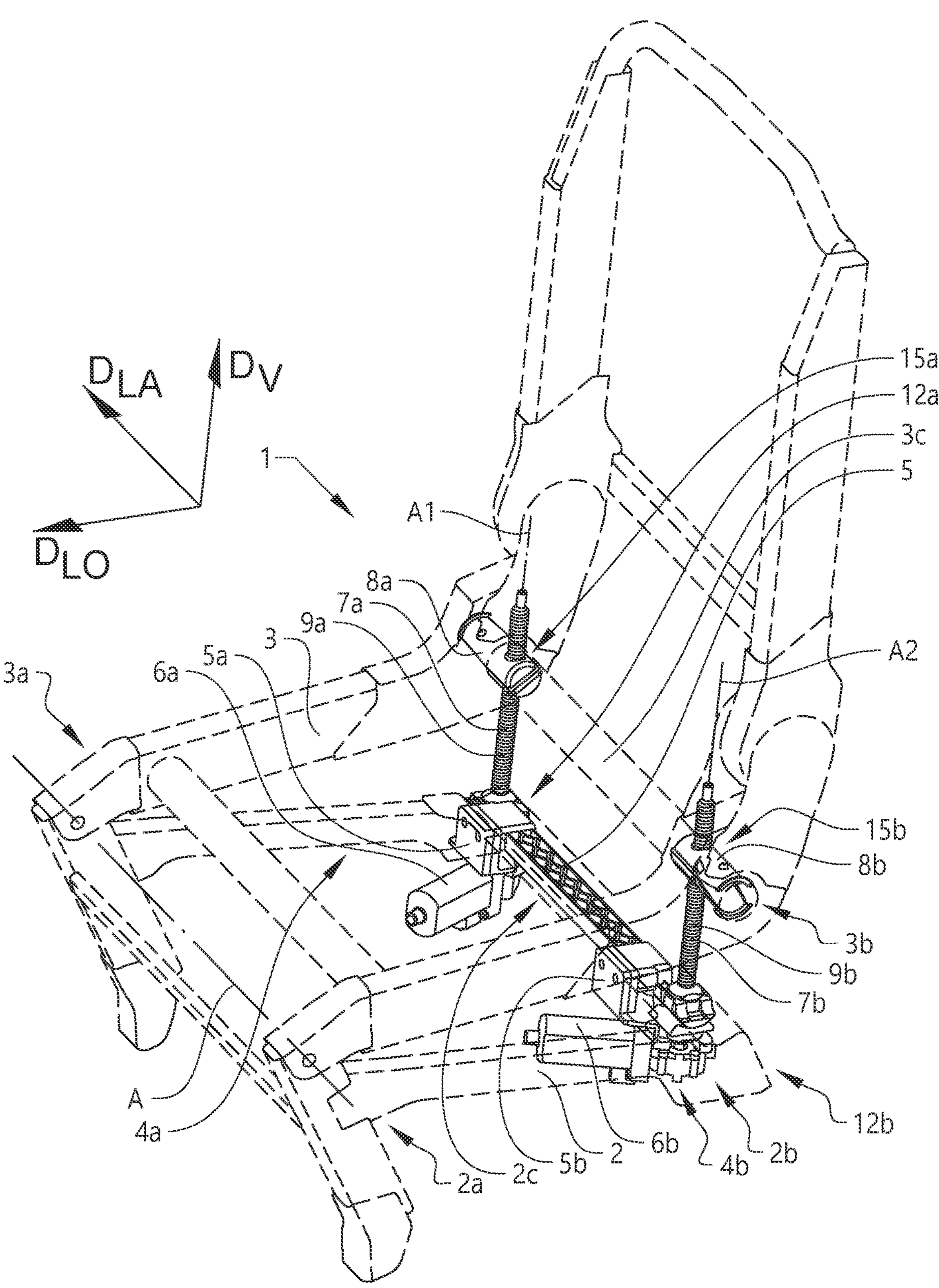
FIG. 2 shows schematically, in a perspective front view from above, the vehicle seat with the actuating assembly and a beam structure according to the disclosure.
Figure 3:
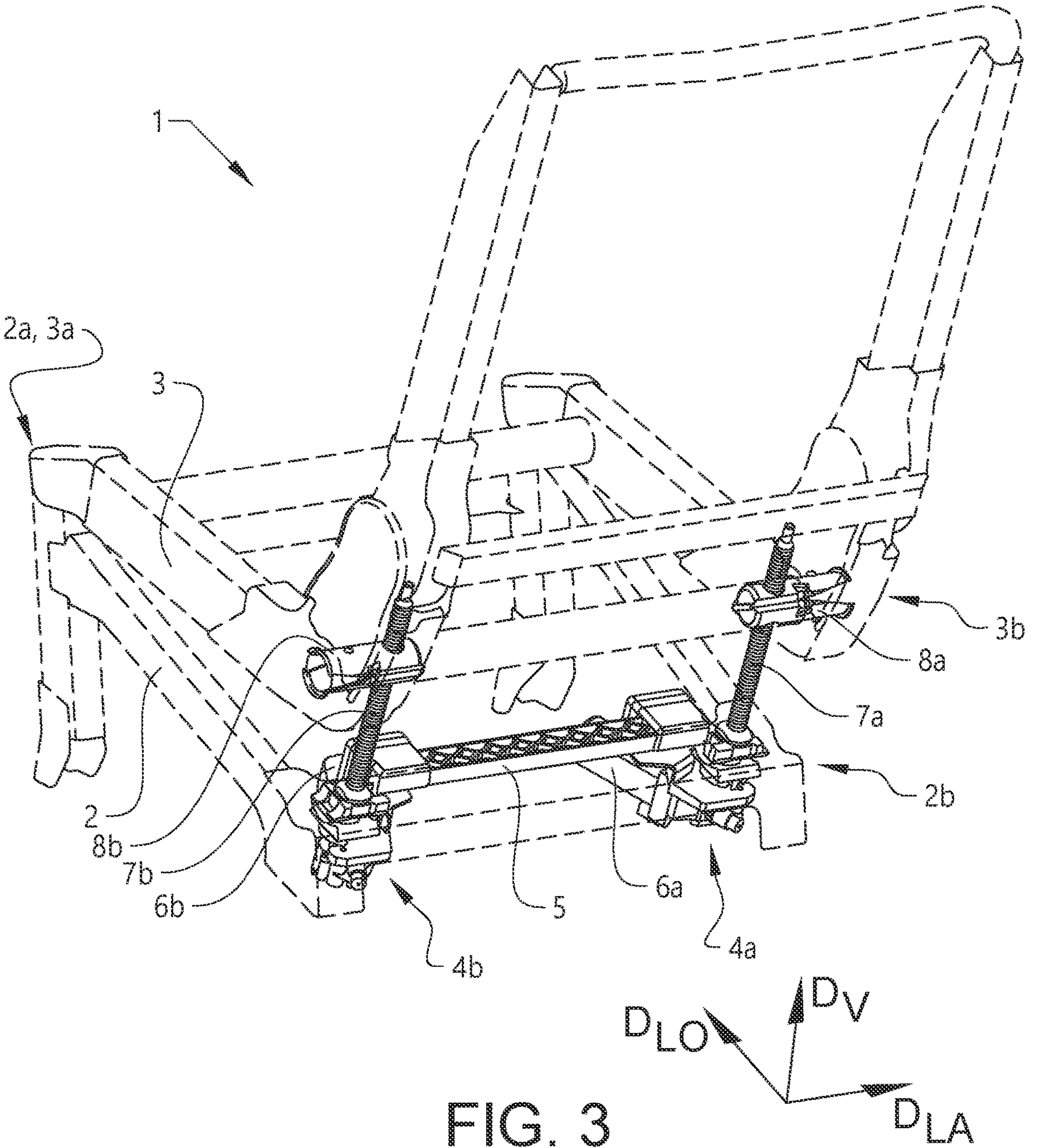
FIG. 3 shows schematically, in a perspective rear view from above, the vehicle seat with the actuating assembly and the beam structure according to the disclosure.

As illustrated in FIGS. 2 and 3, the vehicle seat 1 comprises a lower frame 2 and a movable upper frame 3. The upper frame 3 is pivotably arranged in relation to the lower frame 2. In the illustrated embodiment, the lower frame 2 comprises a front part 2*a* and a rear part 2*b*. The upper frame 3 comprises a front part 3*a* and a rear part 3*b*. The front part 3*a* of the upper frame 3 is pivotably arranged in relation to the front part 2*a* of the lower frame 2 around a front pivot axis A. The front pivot axis A is extending in the lateral direction $D_{LA}$ or essentially in the lateral direction $D_{LA}$, allowing the upper frame 3 to be raised or lowered for adjusting a seating height and a seating angle $\alpha$ of the vehicle seat 1. The upper frame 3 is movably connected to the lower frame 2 via the actuating assembly 4, and as understood from for example FIGS. 1 and 2, the rear part 3*b* of the upper frame 3 is movably connected to the rear part 2*b* of the lower frame 2 via the actuating assembly 4. With this arrangement, the rear part 3*b* of the upper frame 3 is height adjustable and configured for being raised or lowered. The upper frame 3 may, as illustrated in for example 2 be connected to a backrest structure, and the backrest structure may suitably be adjustably attached to the upper frame 3. The lower frame 2 is suitably connected to a rail structure or similar arrangement for longitudinal adjustment of the vehicle seat 1 relative to a floor structure of the vehicle V.

The actuating assembly 4 comprises a first actuator 4*a* and a second actuator 4*b*, as shown in FIGS. 2-6A. The first actuator 4*a* and the second actuator 4*b* are configured to cooperate with each other for displacing the upper frame 3 in relation to the lower frame 2. The first actuator 4*a* is arranged in connection to a first rear lateral side 12*a* of the lower frame 2, and the second actuator 4*b* is arranged in connection to a second rear lateral side 12*b* of the lower frame 2, as understood from the figures. The actuating assembly 4 further comprises a beam structure 5 connected to and extending between the first actuator 4*a* and the second actuator 4*b*. The beam structure 5 is extending in the lateral direction $D_{LA}$, as understood from the figures. The beam structure 5 may be made of any suitable material providing high bending and torsional stiffness, such as for example polymeric materials, composite materials or metals. A high bending and torsional stiffness of the beam structure 5 is desired for minimizing movement between the actuators for an efficient adjustment of the vehicle seat 1 via the actuators.

In the illustrated embodiment, the first actuator 4*a* comprises a first drive unit 6*a* and a first displacement member 7*a*. The first displacement member 7*a* is arranged between the lower frame 2 and the upper frame 3 and is used for displacing the upper frame 3 relative to the lower frame 2 when driven by the first drive unit 6*a*. The first drive unit 6*a* is attached to the beam structure 5, and the first drive unit 6*a* is suitably attached to a first bracket 5*a* or similar arrangement of the beam structure 5. The first bracket 5*a* may be arranged as an integrated structural part of the beam structure 5, or alternatively as a separate part attached to the beam structure 5 as illustrated in for example FIG. 2.

In the illustrated embodiment, the second actuator 4*b* comprises a second drive unit 6*b* and a second displacement member 7*b*. The second displacement member 7*b* is arranged between the lower frame 2 and the upper frame 3 and is used for displacing the upper frame 3 relative to the lower frame 2 when driven by the second drive unit 6*b*. The second drive unit 6*b* is attached to the beam structure 5, and the second drive unit 6*b* is suitably attached to a second bracket 5*b* or similar arrangement of the beam structure 5. The second bracket 5*b* may be arranged as an integrated structural part of the beam structure 5, or alternatively as a separate part attached to the beam structure 5 as illustrated in for example FIG. 2.

Figure 6A:
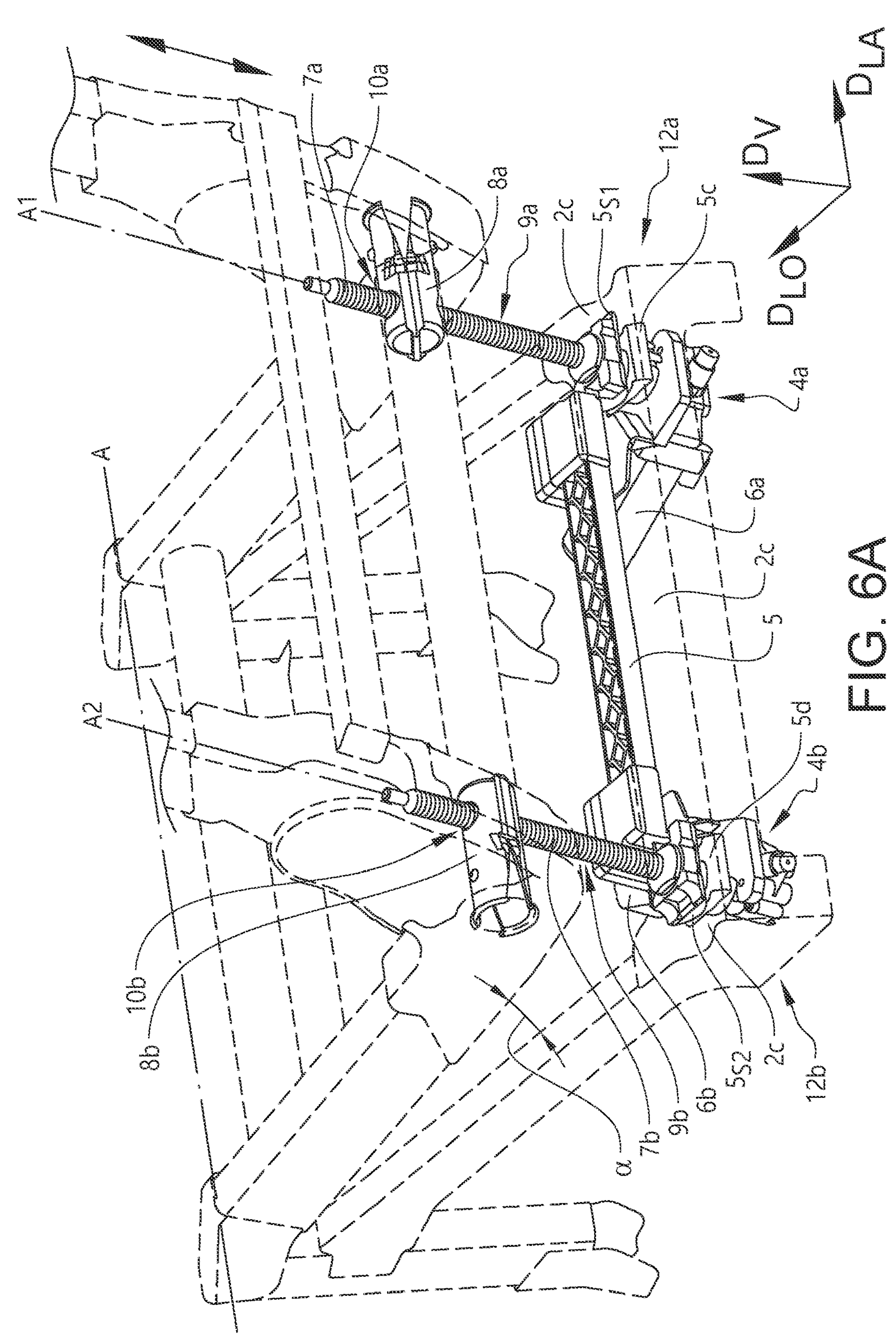
FIGS. 6A-6B show schematically, in perspective rear views, a section of the vehicle seat with the actuating assembly and the beam structure, and a section of the vehicle seat without the actuating assembly and the beam structure, according to the disclosure.

The first actuator 4*a* and the second actuator 4*b* are floatingly connected to the lower frame 2 via the beam structure 5. With floatingly connected is meant that the respective actuators are free to move in relation to the lower frame 2 via the beam structure 5. The floating connection has been established through the arrangement of the beam structure 5 to the lower frame 2, where the beam structure 5 is allowed to move relative to the lower frame 2. The lower frame 2 comprises a cradle structure 2*c* that is extending in the lateral direction $D_{LA}$ of the vehicle seat 1, as understood from for example FIGS. 6A-6B. The beam structure 5 is slidingly arranged relative to the cradle structure 2*c* of the lower frame 2, and upon displacement of the upper frame 3 in relation to the lower frame 2 the beam structure 5 is allowed to slide relative to the cradle structure 2*c*. The cradle structure 2*c* has suitably a U-shape like or curved cross-sectional configuration with an upper surface $2c_U$, and a lower surface $2c_L$ as shown in FIGS. 7A-7B. The beam structure 5 is arranged to slide on the upper surface $2c_U$ upon displacement of the upper frame 3 relative to the lower frame 2.

In the illustrated embodiment, the beam structure 5 is provided with a first sliding surface $5_{S1}$ arranged in connection to the first actuator 4*a*, and a second sliding surface $5_{S2}$ arranged in connection to the second actuator 4*b*. The first sliding surface $5_{S1}$ and the second sliding surface $5_{S2}$ are arranged as downwards facing surfaces on lateral opposite sides of the beam structure 5. The first sliding surface $5_{S1}$ and the second sliding surface $5_{S2}$ are positioned in connection to the upper surface $2c_U$ of the cradle structure 2*c*, as shown in for example FIGS. 7A-7B, and during displacement of the vehicle seat 1, the first sliding surface $5_{S1}$ and the second sliding surface $5_{S2}$ are configured to slide relative to the upper surface $2c_U$ due to angular displacement of the displacement members as will be further described below. The first sliding surface $5_{S1}$ and the second sliding surface $5_{S2}$ suitably have shapes corresponding to the shape of the cradle structure 2*c* for an efficient sliding movement. The first sliding surface 5 and the second sliding surface $5_{S2}$, as well as the upper surface $2c_U$ of the cradle structure 2*c* may be provided with or made of low friction material for an efficient sliding movement.

Through the attachment of the first drive unit 6*a* and the second drive unit 6*b* to the beam structure 5, also the first drive unit 6*a* and the second drive unit 6*b* are floatingly connected to the lower frame 2 via the beam structure 5. As shown in for example FIGS. 2, 3, 6A, and 7A-7B, the drive units are positioned below the cradle structure 2*c* for a compact solution of the actuating assembly 4. It should be understood that the first drive unit 6*a* and the second drive unit 6*b* are not attached to the lower frame 2, but instead to the beam structure 5 via the respective first bracket 5*a* and second bracket 5*b*. When the beam structure 5 is moving in relation to the lower frame 2 through the sliding movement between the first sliding surface $5_{S1}$ and the second sliding surface $5_{S2}$ relative to the upper surface $2c_U$ of the cradle structure 2*c*, the first drive unit 6*a* and the second drive unit 6*b* are moving with the beam structure 5 relative to the lower frame 2. In this way, the first drive unit 6*a* and the second drive unit 6*b* are floatingly arranged relative to the lower frame 2 via the beam structure 5.

Figure 4:
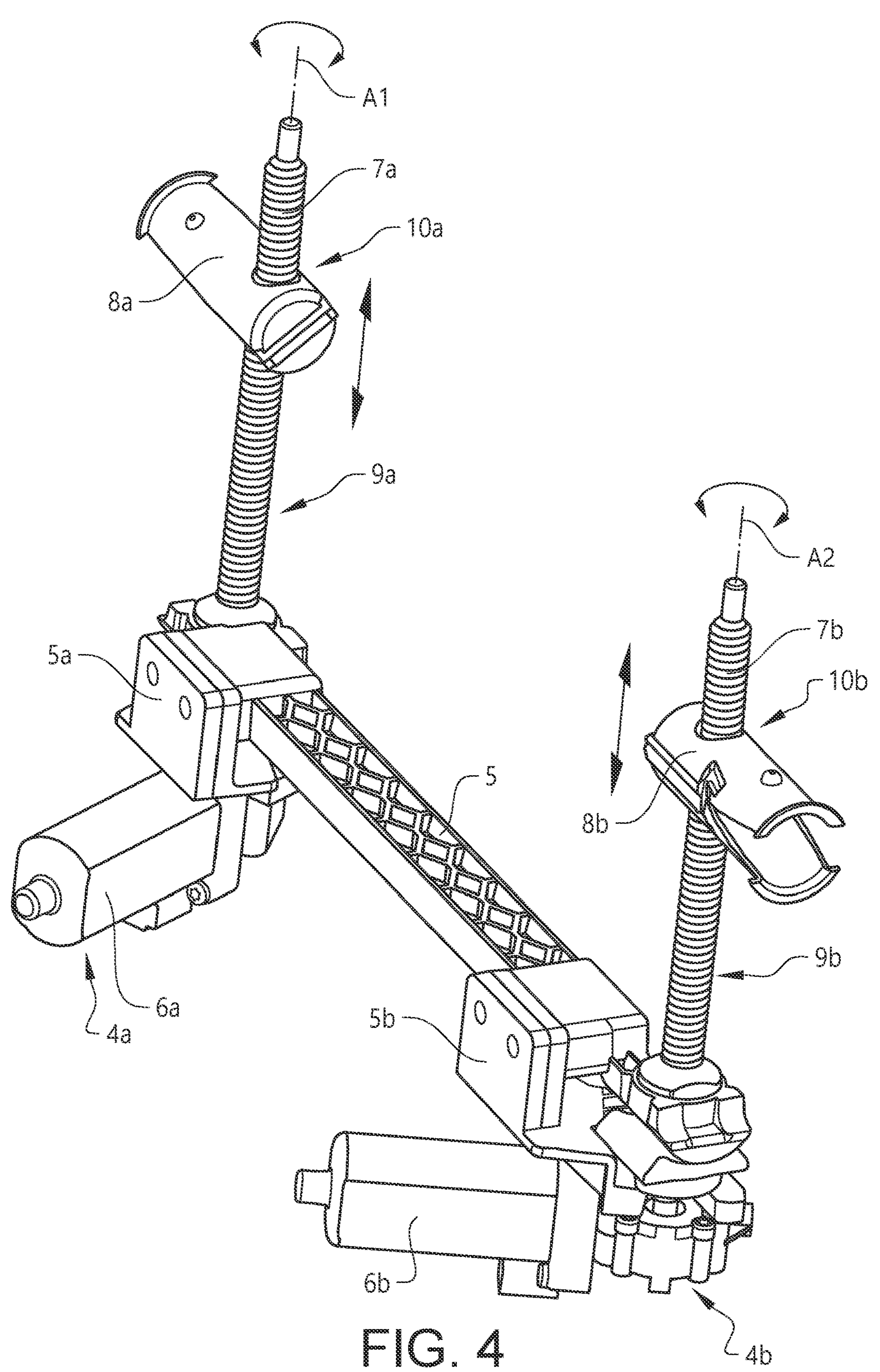
FIG. 4 shows schematically, in a perspective side view, the actuating assembly and the beam structure according to the disclosure.
Figure 5:
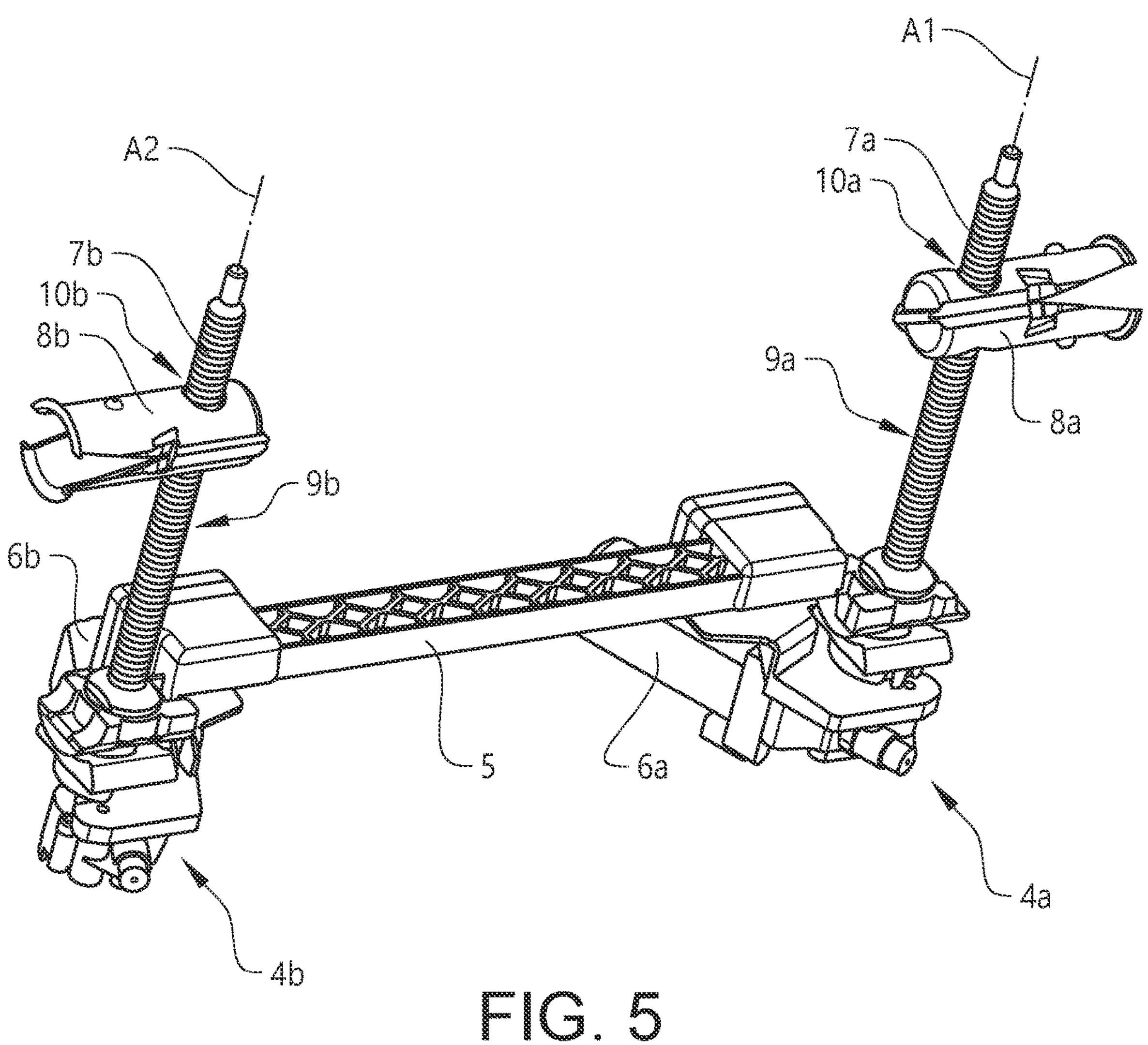
FIG. 5 shows schematically, in a perspective rear view, the actuating assembly and the beam structure according to the disclosure.

As described above, the first actuator 4*a* comprises the first displacement member 7*a*, and the first displacement member 7*a* is rotatably connected to the beam structure 5 via a first bearing 13*a*, as illustrated in FIGS. 7A-7B. The first bearing 13*a* may be of any suitable type and is allowing the first displacement member 7*a* to rotate relative to the beam structure 5. The first displacement member 7*a* has an elongated shape with an axial extension in a first axial direction A1, and the first displacement member 7*a* is arranged to rotate around an axis extending in the first axial direction A1. The first drive unit 6*a* is connected to the first displacement member 7*a* and configured for rotating the first displacement member 7*a* when displacing the upper frame 3 in relation to the lower frame. The first drive unit 6*a* is suitably arranged as an electric motor that is drivingly engaging a lower end 11*a* of the first displacement member 7*a*, where the lower end 11*a* of the first displacement member 7*a* is arranged below the cradle structure 2*c*. The first drive unit 6*a* may be connected to the lower end 11*a* via a gear unit or other suitable gearing mechanism. The first drive unit 6*a* may rotate the first displacement member 7*a* in opposite directions for raising or lowering the upper frame 3 relative to the lower frame 2, as indicated in FIG. 4.

As described above, the second actuator 4*b* comprises the second displacement member 7*b*, and the second displacement member 7*b* is rotatably connected to the beam structure 5 via a second bearing 13*b*, as illustrated in FIGS. 7A-7B. The second bearing 13*b* may be of any suitable type and is allowing the second displacement member 7*b* to rotate relative to the beam structure 5. The second displacement member 7*b* has an elongated shape with an axial extension in a second axial direction A2, and the second displacement member 7*b* is arranged to rotate around an axis extending in the second axial direction A2. The second drive unit 6*b* is connected to the second displacement member 7*b* and configured for rotating the second displacement member 7*b* when displacing the upper frame 3 in relation to the lower frame 2. The second drive unit 6*b* is suitably arranged as an electric motor that is drivingly engaging a lower end 11*b* of the second displacement member 7*b*, where the lower end 11*b* of the second displacement member 7*b* is arranged below the cradle structure 2*c*. The second drive unit 6*b* may be connected to the lower end 11*b* via a gear unit or other suitable gearing mechanism. The second drive unit 6*b* may rotate the second displacement member 7*b* in opposite directions for raising or lowering the upper frame 3 relative to the lower frame 2, as indicated in FIG. 4.

The first drive unit 6*a* and the second drive unit 6*b* are suitable arranged as synchronized electric motors, where the operation of the first drive unit 6*a* and the second drive unit 6*b* are synchronized. Thus, when there is a desire to raise or lower the upper frame 3 relative to the lower frame 2, the first drive unit 6*a* and the second drive unit 6*b* are operated simultaneously for a synchronized rotation of the respective displacement members. The drive units or the displacement members may be connected to sensors for measuring the displacement of the upper frame 3 or the rotational movement of the drive units in order to control that the operation is fully synchronized. The electric motors may be driven in opposite directions for raising or lowering the upper frame 3 relative to the lower frame 2 via the displacement members through rotation of the displacement members. When raising the upper frame 3 both the first drive unit 6*a* and the second drive unit 6*b* may drive the displacement members in a first rotational direction, and when lowering the upper frame 3 both the first drive unit 6*a* and the second drive unit 6*b* may drive the displacement members in a second rotational direction opposite the first rotational direction, as indicated in FIG. 4. In an alternative configuration of the actuating assembly, the first drive unit 6*a* may drive the first displacement member 7*a* in a first rotational direction and the second drive unit 6*b* the second displacement member 7*b* in a second rotational direction opposite the first rotational direction when raising the upper frame 3, and the first drive unit 6*a* may drive the first displacement member 7*a* in the second rotational direction and the second drive unit 6*b* the second displacement member 7*b* in the first rotational direction when lowering the upper frame 3. The rotational directions may depend on the configuration of the displacement members.

The operation of the first drive unit 6*a* and the second drive unit 6*b* may for example be initiated by a user of the vehicle V by actuating a seat adjustment switch, such as a switch knob or other suitable switch component for vehicle seat adjustment. It should be understood that the adjustment of the vehicle seat could be automated and controlled via a control unit, for example via a vehicle user profile with stored seat adjustment or positioning information.

The first displacement member 7*a* and the second displacement member 7*b* are extending through the cradle structure 2*c*. As shown in for example FIG. 6B, the cradle structure 2*c* is provided with a first passage 14*a* for receiving the first displacement member 7*a* and a second passage 14*b* for receiving the second displacement member 7*b*. The first passage 14*a* and the second passage 14*b* may be arranged as two openings in the cradle structure 2*c* with extensions allowing angular displacement of the respective first displacement member 7*a* and second displacement member 7*b*. The lower end 11*a* of the first displacement member 7*a* and the lower end 11*b* of the second displacement member 7*b* are arranged below the cradle structure 2*c*, as shown in FIGS. 7A-7B.

The beam structure 5 further comprises a first structural element 5*c* arranged in connection to the lower end 11*a* of the first displacement member 7*a* and a second structural element 5*d* arranged in connection to the lower end 11*b* of the second displacement member 7*b*. As shown in FIGS. 6A and 7A-7B, the first structural element 5*c* and the second structural element 5*d* are arranged below the cradle structure 2*c* and configured for preventing upward movements of the first displacement member 7*a* and the second displacement member 7*b* in a vehicle impact event. Thus, the first structural element 5*c* and the second structural element 5*d* are restricting an upwards movement of the beam structure 5, where the first displacement member 7*a* and the second displacement member 7*b* are connected to the beam structure 5 for a safe construction. The lower surface $2c_L$ of the cradle structure 2*c* is preventing upwards movements of the first structural element 5*c* and the second structural element 5*d* if the displacement members are exerted to upwards directed forces in a vehicle impact event.

The first structural element 5*c* is suitably arranged in connection to the first bracket 5*a*, as shown in for example FIGS. 7A-7B, and the first structural element 5*c* is positioned between the cradle structure 2*c* and the first drive unit 6*a*. The lower end 11*a* of the first displacement member 7*a* is extending through the first structural element 5*c*. The lower end 11*a* of the first displacement member 7*a* may be provided with a threaded portion and secured with a first nut 16*a* arranged below the first structural element 5*c*. The first structural element 5*c* may be provided with a pre-tensioning mechanism with a first spring unit 17*a*, such as a set of plate springs for pre-tensioning the beam structure 5 towards the cradle structure 2*c* via the first displacement member 7*a*. The pre-tensioning is pushing the first displacement member 7*a* axially downwards for an assembly of the first actuator 4*a* without play for an efficient load distribution in a vehicle impact event.

The second structural element 5*d* is suitably arranged in connection to the second bracket 5*b*, as shown in for example FIGS. 7A-7B, and the second structural element 5*d* is positioned between the cradle structure 2*c* and the second drive unit 6*b*. The lower end 11*b* of the second displacement member 7*b* is extending through the second structural element 5*d*. The lower end 11*b* of the second displacement member 7*b* may be provided with a threaded portion and secured with a second nut 16*b* arranged below the second structural element 5*d*. The second structural element 5*d* may be provided with a pre-tensioning mechanism with a second spring unit 17*b*, such as a set of plate springs for pre-tensioning the beam structure 5 towards the cradle structure 2*c* via the second displacement member 7*b*. The pre-tensioning is pushing the second displacement member 7*b* axially downwards for an assembly of the second actuator 4*b* without play for an efficient load distribution in a vehicle impact event.

With a vehicle impact event is meant any situation where the vehicle V is exposed to impact forces, such as when the vehicle V is hitting an object or an object is hitting the vehicle V. Typical vehicle impact events are when the vehicle V is involved in a crash situation or collision, for example with another vehicle, or if the vehicle V leaves a roadway in a run-off-road collision or similar event. If the vehicle V is involved in a collision, impact forces will act on the vehicle seat 1.

In a rear-end collision, or in a collision where the rear end of the vehicle V runs into an object, the rear part 3*b* of the upper frame 3 is pushed in a direction downwards towards the rear part 2*b* of the lower frame 2, due to impacting forces in the longitudinal vehicle direction $D_{LO}$ in such a vehicle impact event acting on the vehicle seat 1 and causing a rotational movement of the vehicle seat 1. The displacement members and the connections of the displacement members to the respective seat frames are designed to withstand pushing forces in such a vehicle impact event, and the arrangement with the two actuators are providing a balanced load path.

In a head-on collision, or in a collision where the front end of the vehicle V runs into an object, the rear part 3*b* of the upper frame 3 is pulled in a direction upwards away from the rear part 2*b* of the lower frame 2, due to impacting forces in the longitudinal vehicle direction $D_{LO}$ in such a vehicle impact event acting on the vehicle seat 1 and causing a rotational movement of the vehicle seat 1. The displacement members and the connections of the displacement members to the respective seat frames are designed to withstand pulling forces in such a vehicle impact event, and the arrangement with the two actuators are providing a balanced load path.

As shown in FIGS. 2, 3 and 6A, the first displacement member 7*a* is connected to the upper frame 3 via a first pivoting member 8*a* and the second displacement member 7*b* is connected to the upper frame 3 via a second pivoting member 8*b*. The first pivoting member 8*a* and the second pivoting member 8*b* are pivotably connected to the upper frame 3. The first pivoting member 8*a* and the second pivoting member 8*b* are in the illustrated embodiment connected to a beam member 3*c* of the upper frame 3, where the beam member 3*c* is extending in a lateral direction $D_{LA}$. The beam member 3*c* of the upper frame has a tube-like configuration and the first pivoting member 8*a* and the second pivoting member 8*b* are inserted into the beam member 3*c*. In the illustrated embodiment, the first pivoting member 8*a* and the second pivoting member 8*b* have plug-like configurations, and the first pivoting member 8*a* and the second pivoting member 8*b* are free to rotate in relation to the beam member 3*c* upon displacement of the upper frame 3 relative to the lower frame 2. It should however be understood that the first pivoting member 8*a* and the second pivoting member 8*b* may be connected to the upper frame 3 in other ways depending on the design and construction of the vehicle seat 1.

The first displacement member 7*a* is rotatably connected to the first pivoting member 8*a* and the second displacement member 7*b* is rotatably connected to the second pivoting member 8*b*. The first displacement member 7*a* and the second displacement member 7*b* are configured for displacing the upper frame 3 in relation to the lower frame 2 upon rotation of the first displacement member 7*a* and the second displacement member 7*b* respectively. The rotational movement of the first displacement member 7*a* is established by the first drive unit 6*a*, and the rotational movement of the second displacement member 7*b* is established by the second drive unit 6*b*, as described above and indicated in FIG. 4.

In the illustrated embodiment, the first displacement member 7*a* is arranged as a threaded screw with an extension in the first axial direction A1. The first displacement member 7*a* is further arranged with a first threaded section 9*a*. As shown in for example FIG. 6A, the first threaded section 9*a* is arranged with outer threads above the lower end 11*a* of the first displacement member 7*a*. The first pivoting member 8*a* comprises a first threaded opening 10*a* configured for engaging the first threaded section 9*a* of the first displacement member 7*a*. The first threaded opening 10*a* comprises inner threads that are matching the outer threads of the first threaded section 9*a*. The first threaded section 9*a* is thus in threaded engagement with the first threaded opening 10*a* for an efficient engagement between the first displacement member 7*a* and the first pivoting member 8*a*. Upon rotation of the first displacement member 7*a*, the first pivoting member 8*a* is displaced along the first displacement member 7*a* in the first axial direction A1, as indicated with the double arrow in FIG. 4. Depending on the rotational direction of the first displacement member 7*a* and through the threaded engagement, the first pivoting member 8*a* can be moved in a direction upwards or in a direction downwards along the first displacement member 7*a*.

In the illustrated embodiment, the second displacement member 7*b* is arranged as a threaded screw with an extension in the second axial direction A2. The second displacement member 7*b* is further arranged with a second threaded section 9*b*. As shown in for example FIG. 6A, the second threaded section 9*b* is arranged with outer threads above the lower end 11*b* of the second displacement member 7*b*. The second pivoting member 8*b* comprises a second threaded opening 10*b* configured for engaging the second threaded section 9*b* of the second displacement member 7*b*. The second threaded opening 10*b* comprises inner threads that are matching the outer threads of the second threaded section 9*b*. The second threaded section 9*b* is thus in threaded engagement with the second threaded opening 10*b* for an efficient engagement between the second displacement member 7*b* and the second pivoting member 8*b*. Upon rotation of the second displacement member 7*b*, the second pivoting member 8*b* is displaced along the second displacement member 7*b* in the second axial direction A2, as indicated with the double arrow in FIG. 4. Depending on the rotational direction of the second displacement member 7*b* and through the threaded engagement, the second pivoting member 8*b* can be moved in a direction upwards or in a direction downwards along the second displacement member 7*b*.

Figure 6B:
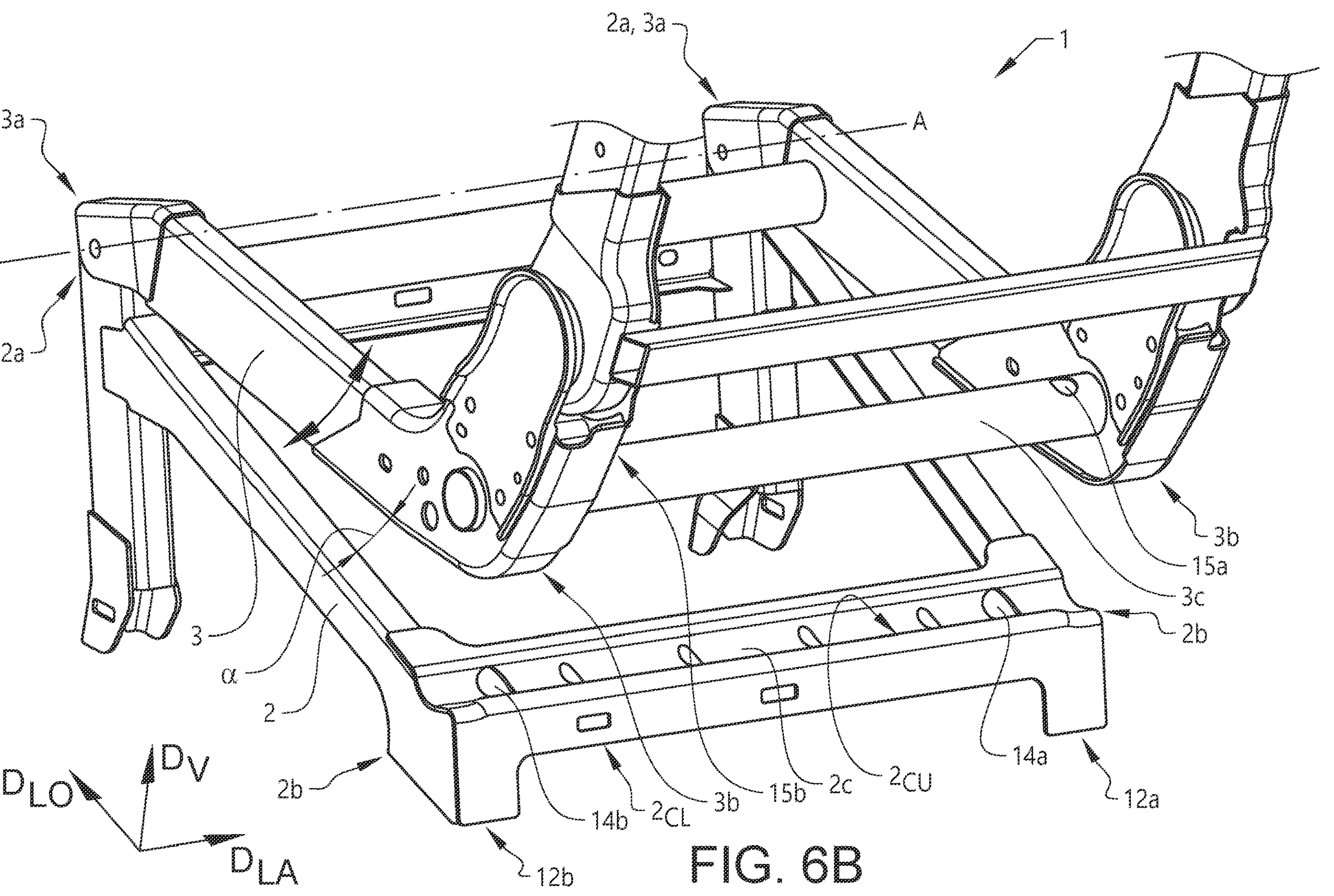
Figure 7A:
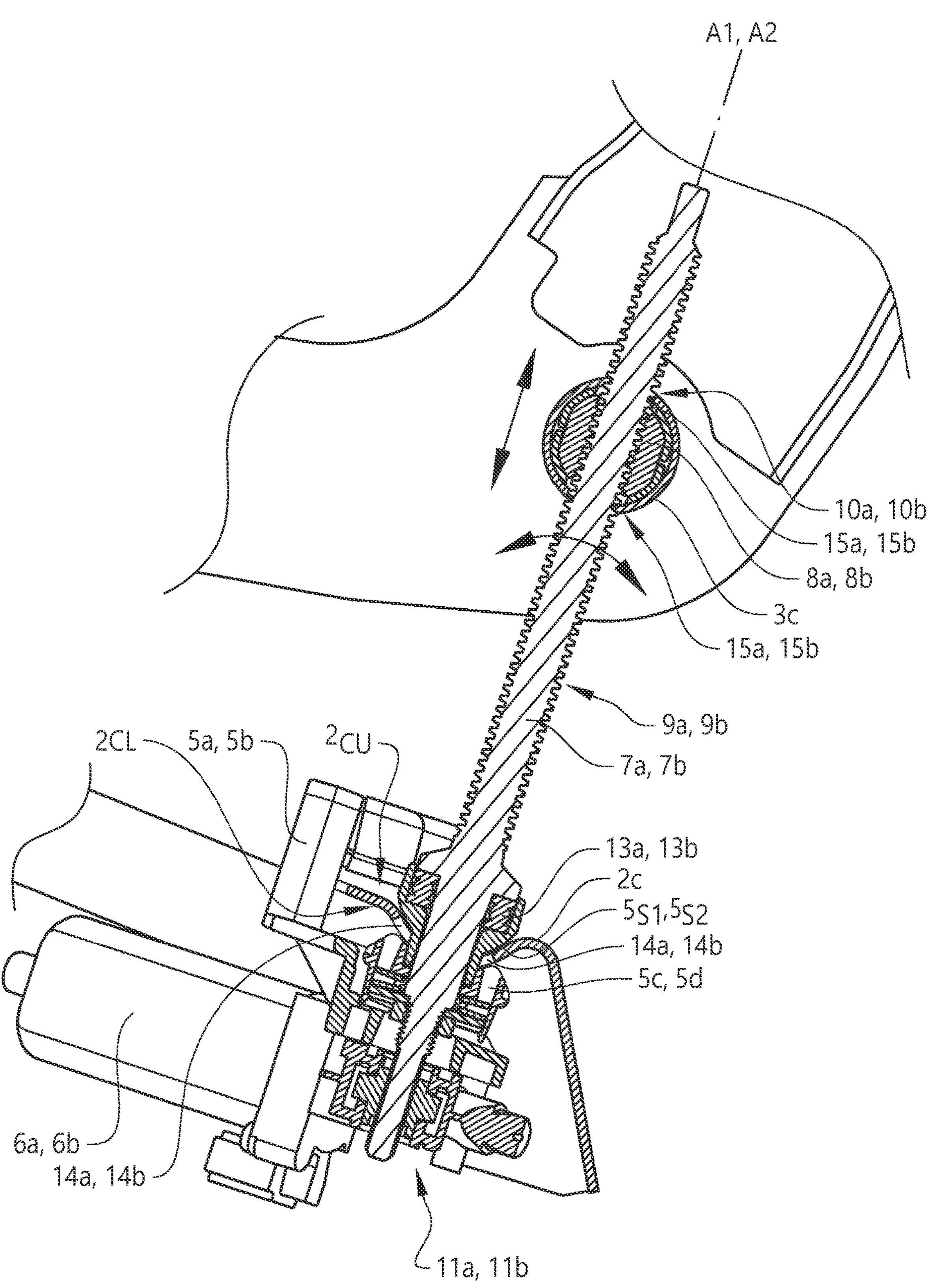
FIGS. 7A-7B show schematically, in a cross-sectional side view and in an enlarged cross-sectional side view, a section of the vehicle seat with the beam structure and a first actuator or a second actuator, and the beam structure and a part of the first actuator or the second actuator, according to the disclosure.
Figure 7B:
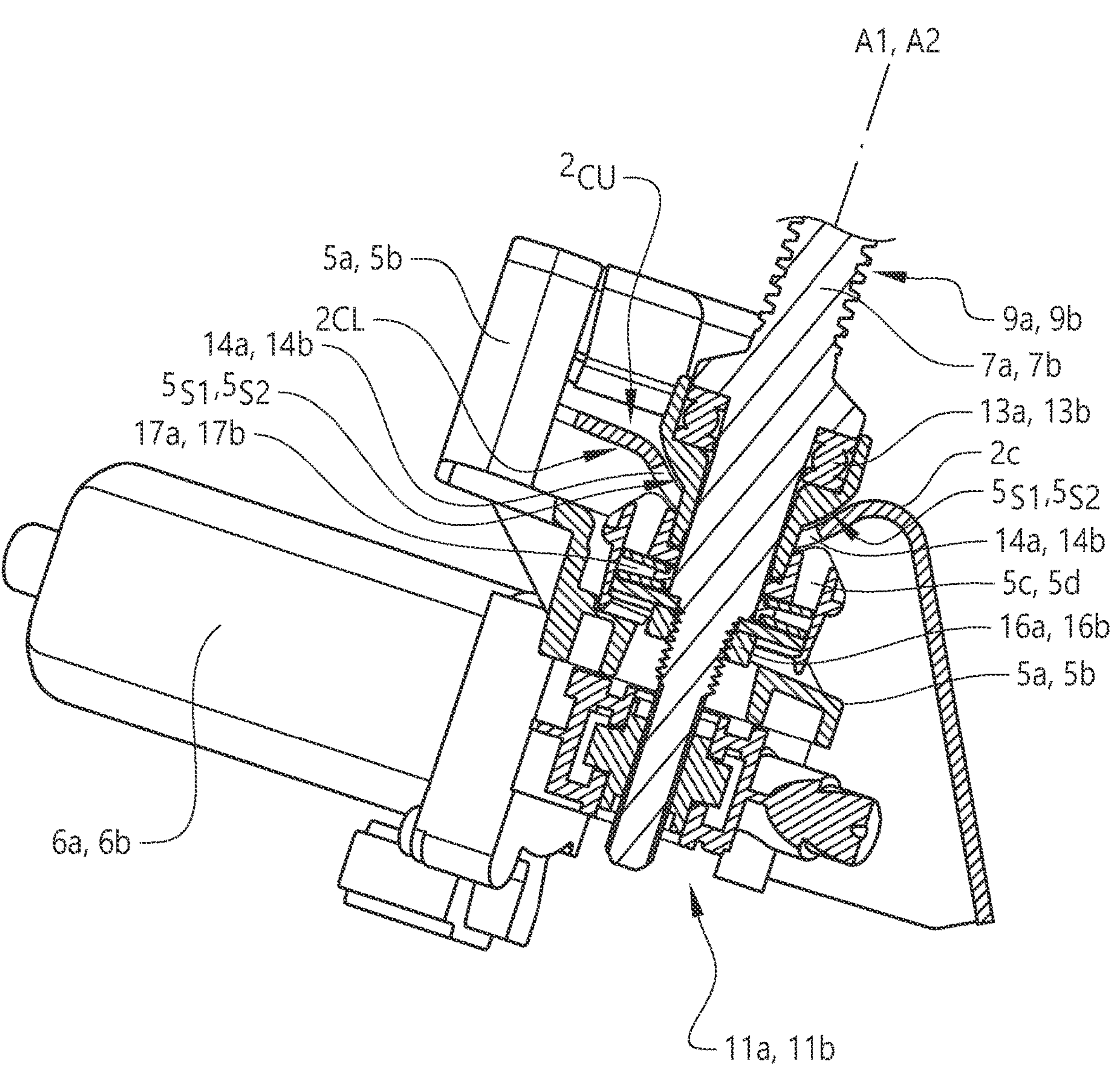

As indicated in FIGS. 6B and 7A, the beam member 3*c* is provided with through bores for receiving the first displacement member 7*a* and the second displacement member 7*b* respectively. A first set of openings 15*a* are arranged in the beam member 3*c* in connection to the first pivoting member 8*a* for receiving the first displacement member 7*a* when threaded into the first threaded opening 10*a* of the first pivoting member 8*a*. The first set of openings 15*a* are having greater extensions than the cross-section of the first displacement member 7*a* for allowing the pivoting movement of the first pivoting member 8*a* relative to the beam member 3*c*. A second set of openings 15*b* are arranged in the beam member 3*c* in connection to the second pivoting member 8*b* for receiving the second displacement member 7*b* when threaded into the second threaded opening 10*b* of the second pivoting member 8*b*. The second set of openings 15*b* are having greater extensions than the cross-section of the second displacement member 7*b* for allowing the pivoting movement of the second pivoting member 8*b* relative to the beam member 3*c*.

Through the connection of the first pivoting member 8*a* and the second pivoting member 8*b* to the upper frame 3, the rear part 3*b* of the upper frame 3 can be displaced in upwards and downwards movements relative to the rear part 2*b* of the lower frame 2 upon simultaneous rotational movements of the first displacement member 7*a* and the second displacement member 7*b* by the respective drive units, as indicated with the double arrow in FIG. 6A.

To operate the vehicle seat 1 for an adjustment of the upper frame 3 relative to the lower frame 2, a control unit is suitably distributing power to the actuating assembly 4. The control unit is for example receiving an actuating command from a switch device operated by a user of the vehicle, or alternatively the control unit is automatically operating the vehicle seat. Upon adjustment of the vehicle seat when the actuating assembly 4 is powered, the first actuator 4*a* and the second actuator 4*b* are operated, and the first actuator 4*a* and the second actuator 4*b* are cooperating for displacing the upper frame 3 in relation to the lower frame 2. When powered, the first drive unit 6*a* and the second drive unit 6*b* are simultaneously rotating the first displacement member 7*a* and the second displacement member 7*b* respectively. The coordinated simultaneous rotational movements of the displacement members are forcing the first pivoting member 8*a* and the second pivoting member 8*b* to move axially along the respective displacement members, as described above for a displacement of the upper frame 3 relative to the lower frame 2. Depending on the rotational direction of the drive units, the pivoting members are simultaneously moving in a direction upwards along the displacement members for raising the upper frame 3 of the vehicle seat 1, or alternatively the pivoting members are simultaneously moving in a direction downwards along the displacement members for lowering the upper frame 3 of the vehicle seat 1. When the upper frame 3 has reached a desired position, the power distribution to the drive units is suitably shut off. When raising the upper frame 3 the seating angle $\alpha$ is increased, and when lowering the upper frame 3 a seating angle $\alpha$ is decreased, as understood from FIGS. 6A-6B.

Through the floating arrangement of the actuators in connection to the lower frame 2, the pivoting arrangement of the upper frame 3 to the lower frame 2, and the pivoting connection of the displacement members in connection to the upper frame 3, the displacement members are exhibiting a small angular displacement for an efficient and tension free operation with optimized load paths, as indicated with the curved double arrow in FIG. 7A. The load paths are extending from the upper frame 3 directly to the lower frame 2 via the displacement members arranged at rear corners of the vehicle seat 1. The drive units are not forming part of the load paths through the floating arrangement and the direct connection of the lower frame 2 and the upper frame 3 via the displacement members, for a direct and efficient force distribution in a vehicle impact event.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

REFERENCE SIGNS

1: Vehicle seat
2: Lower frame
2*a*: Front part, Lower frame
2*b*: Rear part, Lower frame
2*c*: Cradle structure
$2c_U$: Upper surface
$2c_L$: Lower surface
3: Upper frame
3*a*: Front part, Upper frame
3*b*: Rear part, Upper frame
3*c*: Beam member
4: Actuating assembly
4*a*: First actuator
4*b*: Second actuator
5: Beam structure
$5_{S1}$: First sliding surface
$5_{S2}$: Second sliding surface
5*a*: First bracket
5*b*: Second bracket
5*c*: First structural element
5*d*: Second structural element
6*a*: First drive unit
6*b*: Second drive unit
7*a*: First displacement member
7*b*: Second displacement member
8*a*: First pivoting member
8*b*: Second pivoting member
9*a*: First threaded section
9*b*: Second threaded section
10*a*: First threaded opening
10*b*: Second threaded opening
11*a*: Lower end, First displacement member
11*b*: Lower end, Second displacement member
12*a*: First rear lateral side
12*b*: Second rear lateral side
13*a*: First bearing
13*b*: Second bearing
14*a*: First passage
14*b*: Second passage
15*a*: First set of openings
15*b*: Second set of openings
16*a*: First nut
16*b*: Second nut
17*a*: First spring unit
17*b*: Second spring unit
$\alpha$: Seating angle
A: Front pivot axis
A1: First axial direction
A2: Second axial direction
$D_{LA}$: Lateral direction
$D_{LO}$: Longitudinal direction
$D_V$: Vertical direction
V: Vehicle

What is claimed is:

1. A vehicle seat comprising a lower frame and an upper frame, wherein the upper frame is pivotably arranged in relation to the lower frame, wherein the upper frame is movably connected to the lower frame via an actuating assembly, wherein the actuating assembly comprises a first actuator and a second actuator configured to cooperate with each other for displacing the upper frame in relation to the lower frame, wherein the actuating assembly further comprises a beam structure connected to and extending between the first actuator and the second actuator, wherein the first actuator and the second actuator are floatingly connected to the lower frame via the beam structure.

2. The vehicle seat according to claim 1, wherein the first actuator comprises a first drive unit attached to the beam structure, wherein the first drive unit is floatingly connected to the lower frame via the beam structure;

wherein the second actuator comprises a second drive unit attached to the beam structure, wherein the second drive unit is floatingly connected to the lower frame via the beam structure.

3. The vehicle seat according to claim 2, wherein the first actuator comprises a first displacement member rotatably connected to the beam structure, wherein the first drive unit is connected to the first displacement member and configured for rotating the first displacement member when displacing the upper frame in relation to the lower frame;

wherein the second actuator comprises a second displacement member rotatably connected to the beam structure, wherein the second drive unit is connected to the second displacement member and configured for rotating the second displacement member when displacing the upper frame in relation to the lower frame.

4. The vehicle seat according to claim 3, wherein the first drive unit and the second drive unit are synchronized electric motors.

5. The vehicle seat according to claim 3, wherein the first displacement member is connected to the upper frame via a first pivoting member and the second displacement member is connected to the upper frame via a second pivoting member, wherein the first pivoting member and the second pivoting member are pivotably connected to the upper frame.

6. The vehicle seat according to claim 5, wherein the first displacement member is rotatably connected to the first pivoting member and the second displacement member is rotatably connected to the second pivoting member, wherein the first displacement member is configured for displacing the upper frame in relation to the lower frame upon rotation of the first displacement member, wherein the second displacement member is configured for displacing the upper frame in relation to the lower frame upon rotation of the second displacement member.

7. The vehicle seat according to claim 5, wherein the first displacement member is arranged as a threaded screw having an extension in a first axial direction and a first threaded section, wherein the first pivoting member comprises a first threaded opening configured for engaging the first threaded section, wherein upon rotation of the first displacement member the first pivoting member is displaced along the first displacement member in the first axial direction;

wherein the second displacement member is arranged as a threaded screw having an extension in a second axial direction and a second threaded section, wherein the second pivoting member comprises a second threaded opening configured for engaging the second threaded section, wherein upon rotation of the second displacement member the second pivoting member is displaced along the second displacement member in the second axial direction.

8. The vehicle seat according to claim 5, wherein the first pivoting member and the second pivoting member are connected to a beam member of the upper frame, wherein the beam member is extending in a lateral direction.

9. The vehicle seat according to claim 3, wherein the first displacement member and the second displacement member are extending through the cradle structure.

10. The vehicle seat according to claim 9, wherein the beam structure comprises a first structural element arranged in connection to a lower end of the first displacement member and a second structural element arranged in connection to a lower end of the second displacement member, wherein the first structural element and the second structural element are arranged below the cradle structure and configured for preventing upward movements of the first displacement member and the second displacement member in a vehicle impact event.

11. The vehicle seat according to claim 1, wherein the beam structure is slidingly arranged relative to a cradle structure of the lower frame, wherein upon displacement of the upper frame in relation to the lower frame the beam structure is sliding relative to the cradle structure.

12. The vehicle seat according to claim 11, wherein the cradle structure is extending in a lateral direction.

13. The vehicle seat according to claim 1, wherein a front part of the upper frame is pivotably arranged in relation to a front part of the lower frame around a front pivot axis.

14. The vehicle seat according to claim 1, wherein a rear part of the upper frame is movably connected to a rear part of the lower frame via the actuating assembly.

15. The vehicle seat according to claim 1, wherein the first actuator is arranged in connection to a first rear lateral side of the lower frame, and the second actuator is arranged in connection to a second rear lateral side of the lower frame.

16. A method for operating a vehicle seat, wherein the vehicle seat comprises a lower frame and an upper frame, wherein the upper frame is pivotably arranged in relation to the lower frame, wherein the upper frame is movably connected to the lower frame via an actuating assembly, wherein the actuating assembly comprises a first actuator, a second actuator, and a beam structure connected to and extending between the first actuator and the second actuator, wherein the first actuator and the second actuator are floatingly connected to the lower frame via the beam structure, wherein the method comprises the step:

operating the first actuator and the second actuator, wherein the first actuator and the second actuator upon operation are cooperating for displacing the upper frame in relation to the lower frame.

* * * * *